Sept. 6, 1966           N. D. LARKY           3,271,768
RADAR TRACKING SYSTEM
Filed April 17, 1964           3 Sheets–Sheet 1
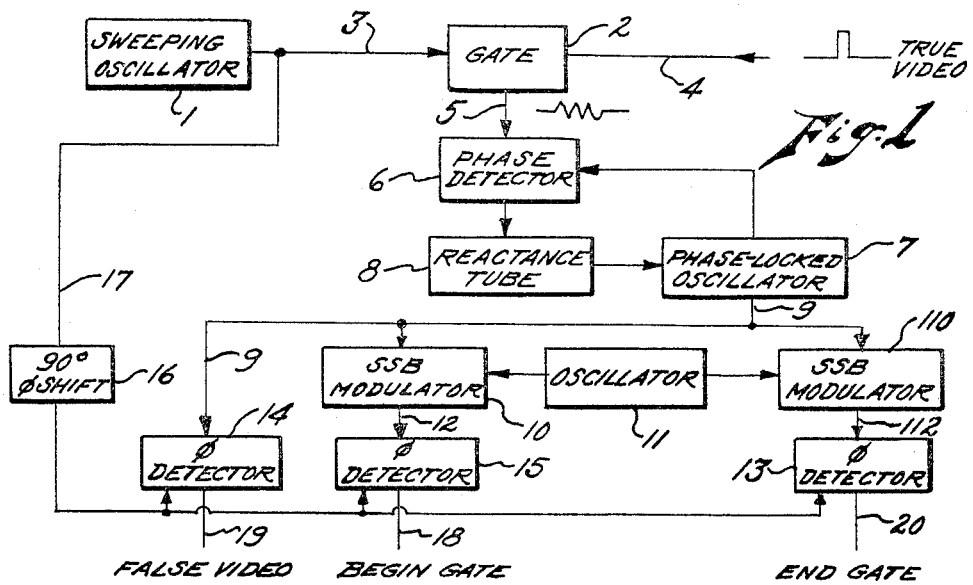
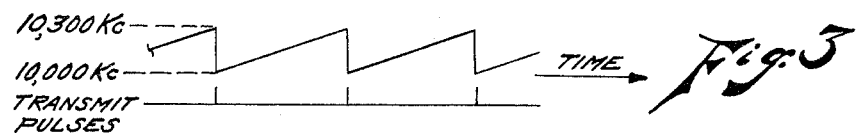
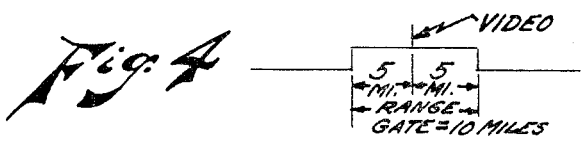
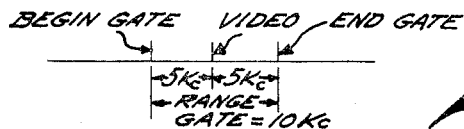
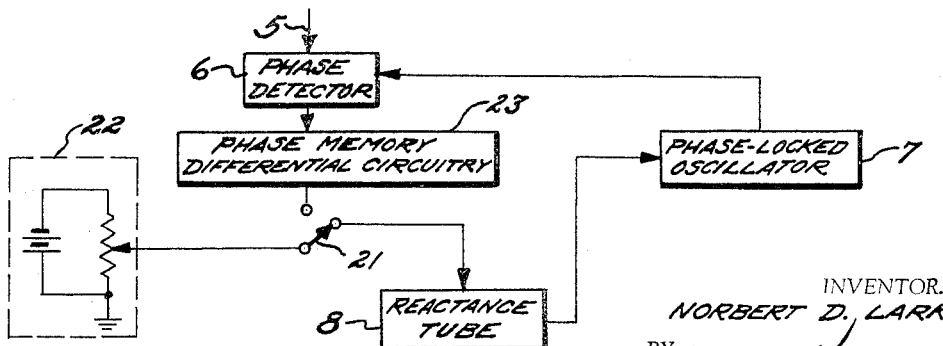
INVENTOR.
NORBERT D. LARKY
BY
ATTORNEYS

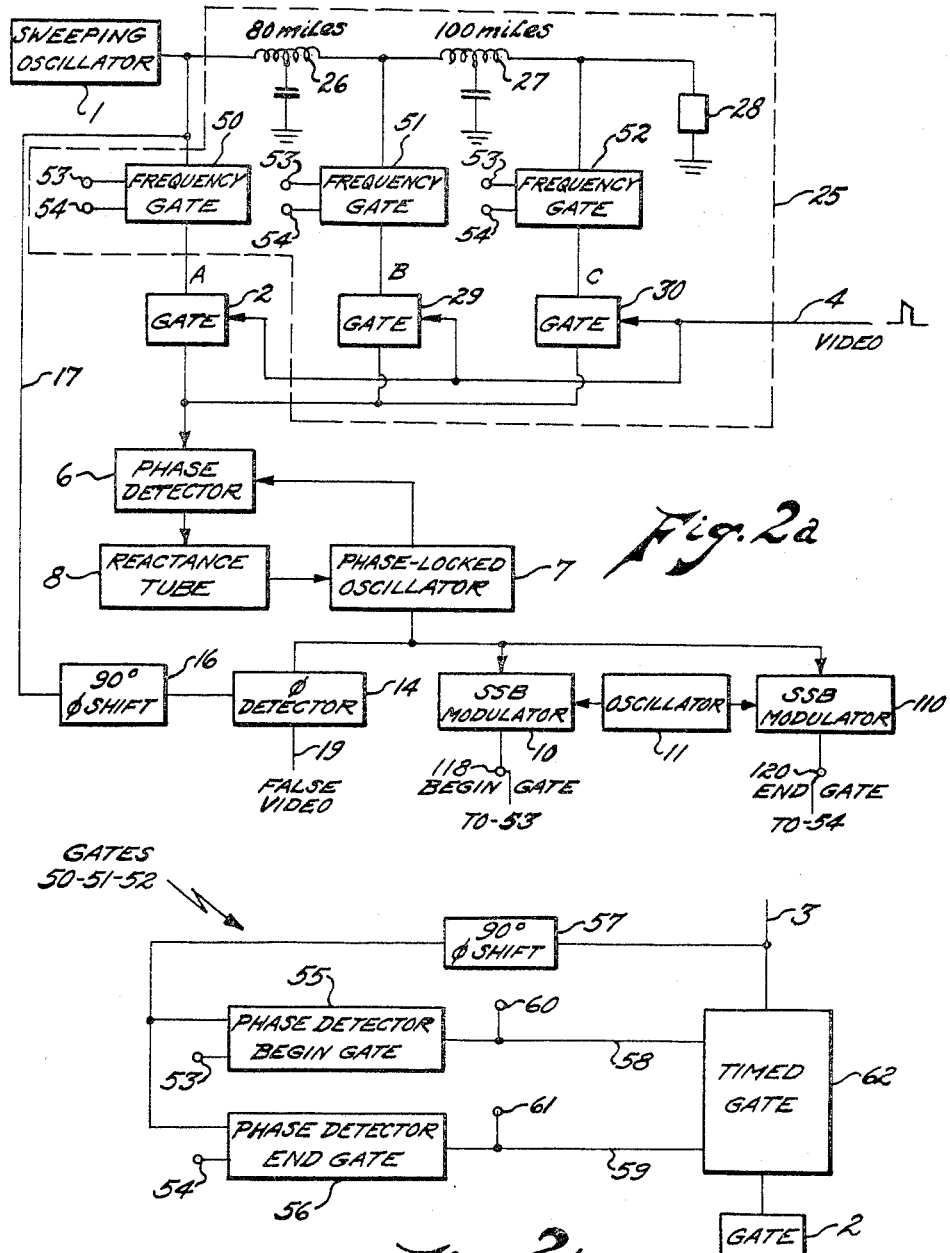

United States Patent Office 3,271,768
Patented Sept. 6, 1966

3,271,768
RADAR TRACKING SYSTEM
Norbert D. Larky, Rialto, Calif., assignor to the United States of America as represented by the Secretary of the Air Force
Filed Apr. 17, 1964, Ser. No. 360,785
2 Claims. (Cl. 343—17.1)

This invention relates to improved means for performing range-tracking and range-gating functions in radar receivers. In certain apparatus, for example, tracking radar systems, it is desirable that the system be responsive to input signals representative of target replies within a specific, limited band of ranges. In addition, in those systems using staggered pulse repetition frequencies as a means of obtaining increased resolution without causing reduction of maximum range capability, it is necessary to distinguish between and obtain correlation with the several staggered pulse trains. It is also desirable in many cases to create a "false" video signal which contains the range information of the true video and which is suitable for operation of subsequent circuitry within the system, and yet which does not suffer from the distortions in pulse shape often experienced by the true video due to atmospheric conditions, weak signal conditions, etc.

The above-mentioned desired effects are often achieved by means of pulse counting and/or electro-mechanical servomechanism circuitry, operating in the real time domain, and as such are subject to problems associated with requirements for precise pulse counting and measurement, as well as those of mechanical stability, electro-mechanical linearity, etc.

According to the teachings of the present invention means are provided for obtaining the functions of range-gating, false video, and coherence in staggered pulse-repetition-frequency systems without incurring the difficulties attendant to prior-art means, by operating in the frequency domain rather than in the time domain.

More specifically, the invention involves, as a first step, the operation of a sweeping oscillator in the fashion of a linear sawtooth pulse generator, sweeping through a frequency range of, say, 10,000 kilocycles to 10,300 kilocycles, to establish a 300 kc. band sweep, corresponding to a target detection range of 300 miles; and as a second step, determining the range of a signal reflecting target by measuring the instantaneous frequency registered by the sweeping oscillator at the moment of receipt of the reflected signal returning from such target. Thus, if the instantaneous frequency is found to be 10,100 kc., for example, at the instant of signal reception, the target is thereby identified as being 100 miles distant.

The features of the invention, both as to organization and method of operation, as well as objects and advantages thereof, will best be understood from the following description when read in conjunction with the accompanying drawings, in which:

FIG. 1 is a block diagram of the invention showing application to single pulse-repetition-frequency systems, with derivation of range gate and false video;

FIGS. 2a and 2b are an extension of the invention over the embodiment of FIG. 1, showing application to staggered pulse-repetition-frequency systems;

FIG. 3 shows the relationship of a sawtooth-sweeping oscillator to transmitted radar pulses in a single-PRF system;

Figure 7:
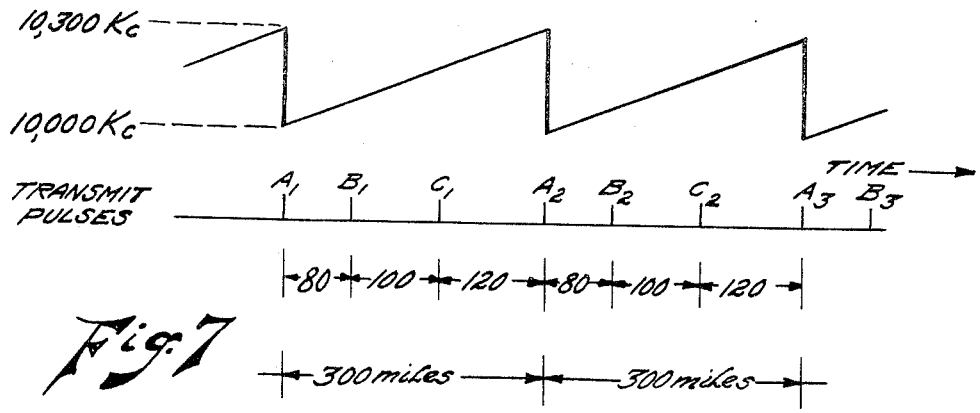
Figure 8:
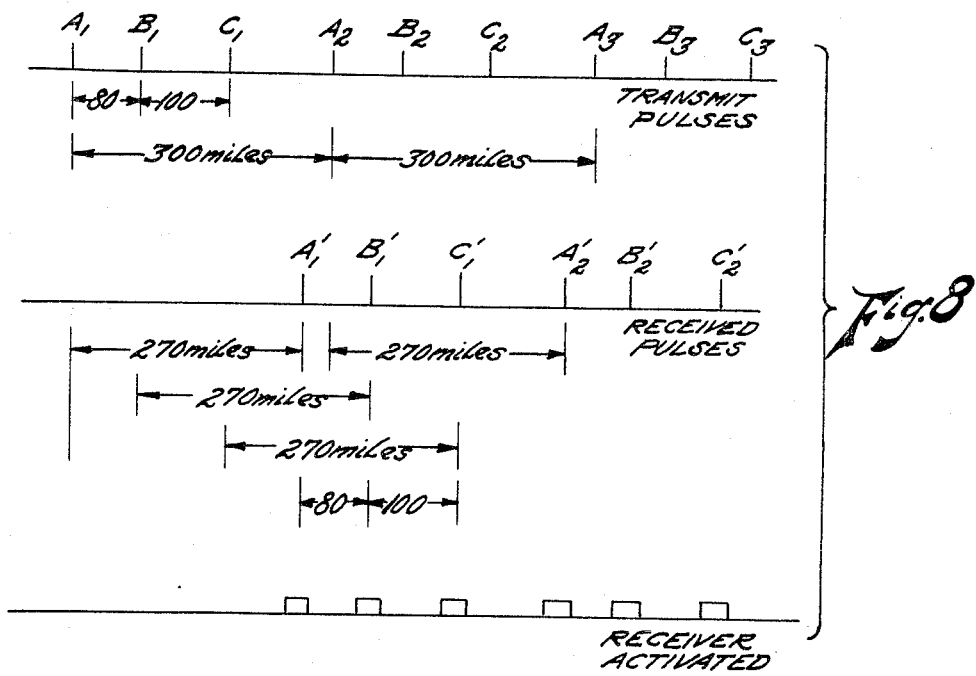

FIG. 4 indicates the relationship of a video signal to its associated range gate in the time domain;

FIG. 5 indicates the relationship of a video signal to its associated range gate in the frequency domain;

FIG. 6 shows circuitry for performing manual range gate slewing and range velocity memory;

FIG. 7 shows pulse timing and oscillator relationships in a staggered-PRF system; and FIG. 8 shows transmitted and received pulse timing relationships with respect to receiver activation times in a staggered-PRF system.

While these figures and the following description are in terms of a radar system, it is understood that the principles outline are not necessarily limited to such a system.

In FIG. 1, a sweeping oscillator 1, which for purposes of this discussion will be said to sweep in a linear-sawtooth manner, between the frequencies of 10,000 kc. and 10,300 kc., operates at a sweep rate which is synchronized with the pulse-repetition frequency (PRF). The nature of this sweep is shown in FIG. 3. It may be considered that the reference frequency of sweeping oscillator 1 is 10,000 kc., corresponding to zero range, and that the limit of the sweep, which is 10,300 kc., corresponds to a range of 300 miles.

Referring again to FIG. 1, the output of sweeping oscillator 1 is fed to a gate circuit 2 via the lead 3. This gate circuit is designed so as to pass through it the signals of lead 3 only when it is activated by the true video signals connected to it via lead 4. The output 5 of the gate circuit will thus be several cycles of the oscillations from sweeping oscillator 1, having a duration equal to the pulse width of the true video, a recurrent periodicity which is that of the true video (and accordingly that of the PRF), and a frequency and phase equal to the instantaneous frequency and phase of the sweeping oscillator 1. It is apparent that the frequency of the bursts of signal which appear on 5 is thus directly related to the time of occurrence of the true video signal, and therefore is directly representative of range. In the particular example cited here, 10,000 kc. would be representative of zero range, 10,000 kc. of 100 miles range, 10,150 kc. of 150 miles range, etc.

The signal appearing on 5 is used as one input to a phase detector 6, which has as its other input the output of a phase-locked oscillator 7. The oscillator 7, in this example, is capable of operation over the frequency range from 10,000 kc. to 10,300 kc., its exact frequency being controlled by a reactance tube 8 or other appropriate control device. The phase detector 6, oscillator 7, and reactance tube 8, when connected as shown in FIG. 1 and supplied with input signal 5, comprises a phase-locking servo loop whereby the output signal of oscillator 7 will be identical in frequency and phase to that of the input signal 5. The output signal of oscillator 7, appearing on lead 9, is seen to be a continuous signal whose frequency is representative of the target range.

The functions of gate 2 and phase detector 6 in producing phase and frequency control of phase-locked oscillator 7 when operating in conjunction with reactance tube 8 may also be achieved according to the teachings of my Patent 2,879,328. Additionally, the functions of gate 2, phase detector 6, phase-locked oscillator 7, and reactance tube 8 may be achieved by means of a gated, burst synchronized oscillator of the type described in my Patent 2,879,329.

In order to provide the function of range-gating, it is necessary to provide signals which will enable (activate) the receiver circuitry prior to the time of reception of the true video signal, and disable (deactivate) the receiver circuitry thereafter. The total width of this gate, in miles, is not pertinent to this discussion, and it will be assumed that a total gate width of 10 miles is desired. The video signal, ideally, should be situated at the mid-point of this gate. This is illustrated in FIG. 4.

The desired condition of having the range gate *always* centered above the video is achieved, as shown in FIG. 1, as follows: The output signal 9 from phase-locked oscillator 7 is modulated in two signal-sideband, suppressed carrier modulators 10 and 110 by a 5 kc. signal from the 5 kc. oscillator 11. These modulators are so designed that the output signal from modulator 10, appearing on lead 12, will consist of a lower sideband only, 5 kc. below the frequency of phase-locked oscillator 7, and the output signal from modulator 110, appearing on lead 112, will consist of an upper sideband only, 5 kc. above the frequency of phase-locked oscillator 7. Since the frequency of phase-locked oscillator 7 is representative of target range, the lower and upper sidebands will be representative of ranges 5 miles less than, and 5 miles greater than the target range. This is illustrated in FIG. 5.

Note that the width of the range gate is determined solely by the frequency of oscillator 11. For example, if a 2 mile gate is desired then oscillator 11 would operate at 1 kc. Note also that in all cases the video will be *exactly* centered in the range gate.

Having performed all the foregoing operations in the frequency domain, it is now necessary to convert back to the time domain in order to implement use of the video and range gating signals. This is accomplished, as shown in FIG. 1, by applying to one input of a series of phase detectors 13, 14, and 15 the signals of leads 12, 112, and 9. The signal from sweeping oscillator 1, which is present on lead 3, is passed via lead 17 to a 90 degree phase shift circuit 16 and then applied to the other input of phase detectors 13, 14, and 15. These phase detectors may be one of the double diode types familiar to those versed in the art, or alternatively may be of the type taught in my Patent 2,879,329. In the latter case, if the circuit of FIG. 4 is adjusted so as to have the characteristics of FIG. 6(*a*), where these figures refer to those of Patent 2,879,329, the 90 degree phase shift circuit 16 (FIG. 1 of this patent) will not be required.

Consider now the operation of phase detectors 13, 14, and 15 when driven by the output signals from modulators 10 and 110 and 90 degree phase shifter 16. These phase detectors are responsive only when the signals of leads 12 and 17 or leads 112 and 17 or leads 9 and 17 are of identical frequency and phase. Accordingly, phase detector 15 will provide an output signal on line 18 at the time when the signal of sweeping oscillator 1, as present on lead 17, is in frequency and phase correspondence with the lower side band signal at lead 12. Similarly, output signals will appear at leads 19 and 20, the output leads of phase detectors 14 and 13, as the frequency of sweeping oscillator 1 passes through the carrier frequency and upper sideband frequency signals on leads 9 and 112.

It is apparent that the signal at lead 19 will appear at a time corresponding to that of the returned true video signal, as referenced to the instantaneous frequency of sweeping oscillator 1, and will be indicative of target range. Similarly, the signals at leads 18 and 20 will appear at times corresponding to a range of five miles before the target and five miles beyond the target, respectively, and will thus be suitable for activating receiver gating circuitry.

Note that any non-linearities which may be present in the sweep characteristic of oscillator 1 do not introduce timing errors in the signals of leads 18, 19, and 20 because of the error-cancellation achieved by use of oscillator 1 as the source for both inputs to the phase detectors 13, 14, and 15, one input being via lead 17 and the other input via leads 3, 5, and 9.

Further consideration of the output signal of phase detector 14, as present on lead 19, shows that this signal is a "false video" signal, having the range information of the true video signal, but having none of the pulse-shape distortions which the true video signal might ordinarily suffer due to atmospheric conditions, weak signal conditions, etc.

The system as described above is clearly operative in the case of a stationary radar target. For an outbound moving target, it is only necessary to observe that the true video signals at lead 4 will occur at successively later points along the sweep characteristic of oscillator 1, corresponding to successively higher instantaneous frequencies. The output signal of phase-locked oscillator 7 will follow in frequency and phase correspondence, and thus the position of the true video signal at lead 19 and its accompanying Begin Gate and End Gate at leads 18 and 20 will move out in range.

The system of FIG. 1 is particularly immune to noise, and highly tolerant of missing video replies, because of the inherent fly-wheel effect of phase-locked oscillator 7. The limiting factor in noise immunity achievement will be the time constant of the phase lock loop comprising elements 6, 7, and 8; this time constant should not be so great as to prevent the system from tracking at the desired maximum target velociy.

Manual slewing of the range gate, generally desired in radar systems, is readily possible with the system of FIG. 1. As shown in FIG. 5, it is only necessary to break the connection between phase detector 6 and reactance tube 8, and provide a switch 21 which can select either the signal from phase detector 6, for the condition of automatic tracking, or a suitable potential from the manually-adjustable potential source 22 for the condition of manual slew.

Additionally, the feature of a range velocity memory for the range gate is readily provided whereby in the absence of video signals at lead 4, the range gate will continue to move at the velocity which obtained immediately prior to the loss of signals. Performance in this manner results from the use of differentiation circuitry 23 in FIG. 6, which operates upon the output of phase detector 6 so as to provide a changing voltage at terminal 24 of switch 21 which is representative of the first differential, or velocity, of the target.

The foregoing discussion in conjunction with FIGS. 1, 3, 4, 5, and 6 has been descriptive of a single-PRF system. The invention may also be extended so as to be applicable to staggered-PRF systems, as described in the following discussion, to which FIGURES 2, 7 and 8 are pertinent.

For purposes of explanation, it will be assumed that the system is one in which pulses are transmitted in groups of three, wherein a first pulse A, is transmitted at a time corresponding to zero range, a second pulse B, at a time corresponding to 80 miles range, and a third pulse C, at a time corresponding to 180 miles range (100 miles spacing between B and C). This group is then followed by a second A pulse at a time again corresponding to zero range, and at a spacing of 120 miles from the C pulse. The sequence of groups and pulses within groups is continuous, and is diagrammed in FIG. 7. Systems of this type, and their advantages of increased resolution without loss of range, are well-known to those versed in the art and need not be detailed in this discussion.

Briefly described, the proper utilization of a staggered PRF system requires that the receiver have the capability of distinguishing received A' pulses from received B' pulses, etc., and then correlating these with their associated transmit pulses A, B, etc. The system then measures range by measuring the time lapse between a transmitted $A_1$ pulse and its return $A_1'$ pulse, a transmitted $B_2$ pulse and its return $B_2'$ pulse, etc. As seen in FIG. 8, the transmitted and received pulses may interweave in time for certain target ranges, and thus the achievement of pulse coherency is a necessary requirement. Naturally, the range gate must activate the receiver at the times when the return pulses are received. The above objects may be achieved by the circuitry of FIG. 2; it is seen that this system is the same as that of FIG. 1 in its essentials, and differs from the system of FIG. 1 by the addition of the components 25. These consist of, in detail, two delay lines 26 and 27, serially connected and appropriately terminated by impedance 28; two gates 29 and 30 identical to gate 2, frequency-responsive gates 50, 51, and 52, and associated connecting leads and terminals.

Delay lines 26 and 27 are of such length and time delay that the signal from delay line 27 to the input of gate 30, appearing on terminal 31, will be representative of zero range, while at the same time the signal from delay line 26 to the input of gate 29, appearing on terminal 32, will be representative of 80 miles range, and also at this same time the signal which drives the serially-connected delay lines 26 and 27, appearing on lead 3 and used as an input to gate 2, will be representative of 180 miles range. Since the sweeping rate of oscillator 1 is representative of 300 miles it will be seen that a gate relationship which is compatible with the conditions of FIG. 7 has thus been established.

The three outputs of gates 2, 29, and 30 are parallel-connected and used to control the servo phase lock loop consisting of elements 6, 7, and 8. Although these gate outputs are parallel-connected, it will be shown later that the video signal causes sequential control bursts to be applied to the phase detector 6.

Consider now the operation of the system of FIG. 2(a); FIG. 2(b), FIG. 7, and FIG. 8 will be useful to this discussion. A pulse $A_1$ (FIG. 7 and FIG. 8) is transmitted; for a target at 270 miles range, the return video pulse will be $A_1'$. This return video pulse, appearing on lead 4, will activate gate 2, which in turn will pass a burst signal (the instantaneous frequency of sweeping oscillator 1) through to phase detector 6. Subsequent portions of the circuit will then operate as in FIG. 1. Such behavior is dependent, however, on activation of the frequency gate 50, which must be open in order to allow signal from oscillator 1 to pass on to gate 2. In order to achieve the objectives of pulse identification and coherency, frequency gate 50 must be open only during that period when oscillator 1 has a frequency in the region corresponding to the target range. Most appropriately, frequency gate 50 should be open at the same time that the range gate activates the receiver circuitry. Concurrently, frequency gates 51 and 52 should be open only when the delayed oscillator signal on leads 32 and 31 corresponds to the range gate period.

Under the above-described conditions, gates 50 and 2 will be responsive only to A' pulses, gates 51 and 29 will be responsive only to B' pulses, and gates 52 and 30 will be responsive only to C' pulses; pulse identification and coherency is thus achieved. Note that, although gates 2, 29, and 30 have their output terminals connected in parallel, they provide sequential control bursts to the phase detector 6. Thus, all received pulses, regardless of their classification as A, B, or C, act to control the oscillator 7, and thus to determine the range gate and to generate the false video signal at lead 19.

Circuitry capable of performing the functions of frequency gates 50, 51, and 52 is described below and diagrammed in FIG. 2(b). Begin Gate and End Gate signals from leads 118 and 120 are applied to terminals 53 and 54 of phase detectors 55 and 56. The other input of these phase detectors is the signal of lead 3, applied via a 90° phase shift circuit 57. The outputs of phase detector 55, appearing on lead 58, will be a pulse corresponding in time to the beginning of the range gate, and may be applied via terminal 60 to activate the receiver circuitry. This signal is also applied via lead 58 to open the timed gate 62. Similarly, the output of phase detector 56, appearing on lead 59, and corresponding in time to the end of the range gate, is applied via terminal 61 to deactivate the receiver circuitry. This signal is also applied via lead 59 to close the timed gate 62.

It is apparent that all the advantages of the single PRF system of FIG. 1 exist in the multiple-staggered-PRF system of FIG. 2(a), and that generation of range gate and false video signal, capability for range memory and for manual range gate slew, and inherent noise immunity are obtained without incurring the disadvantages of prior-art methods.

For the multiple-staggered PRF system of FIG. 2(a), where video returns occur three times as often, the accuracy will be three times as great as in the single PRF system.

Accuracy is a function of the injection-locking duty cycle, and thus a function of the PRF, which is directly proportional to maximum range capability. Thus, for a maximum range of 1,000 miles (3.3 times the 300 mile range of the example) the accuracy of the single PRF system will be 10 feet, and that of the triple-PRF system will be 3.3 feet. Range may be determined in the frequency domain, rather than by means of pulse-spacing measurements in the time domain, by measuring the frequency of oscillator 7.

What is claimed is:
1. A multiple PRF radar system comprising:
 (a) a sweeping oscillator;
 (b) means for transmitting a repeating sequence of pulses with each pulse having a continually higher frequency dependent upon the instantaneous frequency of the sweeping oscillator at the time of transmitting;
 (c) means for receiving the echoed true video pulses;
 (d) a plurality of delay lines connected to the sweeping oscillator;
 (e) a plurality of frequency gates connected to the delay lines;
 (f) a plurality of echo gates connected to the receiving means with each of the echo gates connected to one of the frequency gates wherein only one gate at a time will produce an output pulse frequency dependent upon target range;
 (g) a means for generating a continuous signal having a frequency equal to the output frequency of the activated echo gate, the continuous signal generating means including a first phase detector fed by one of the echo gates, a reactance tube fed by the first phase detector, a phase locked oscillator controlled by the reactance tube and connected to the first phase detector, with the first phase detector, the reactance tube, and the phase locked oscillator forming a looped circuit;
 (h) a fixed frequency oscillator;
 (i) a first single sideband modulator fed by the fixed frequency oscillator and the phase locked oscillator and having a frequency output lower than the frequency of the input pulse by an amount equal to the frequency of the fixed frequency oscillator, the output being used to control the frequency gates and to control activation of the receiving means;
 (j) a second single sideband modulator fed by the fixed frequency oscillator and one of the echo gates and having a frequency output higher than the frequency of the input pulse by an amount equal to the frequency of the fixed frequency oscillator, the output being used to control the frequency gates and to control deactivation of the receiving means;

(k) a phase shifter connected to the sweeping oscillator;
(l) and a second phase detector fed by the phase shifter and one of the echo gates for producing an output indicative of range.

2. A radar system according to claim 1 wherein each of the frequency gates comprise:
(a) a phase shifter fed by the sweeping oscillator;
(b) a first and second frequency gate phase detectors fed by the phase shifter and by the first and second single sideband modulators respectively;
(c) and a time gate controlled by the outputs of the first and second frequency gate phase detectors.

No references cited.

CHESTER L. JUSTUS, *Primary Examiner.*

LEWIS H. MYERS, *Examiner.*

R. D. BENNETT, *Assistant Examiner.*